Nov. 6, 1923.
D. A. WALLACE
MEAT PRESS
Filed March 30, 1922
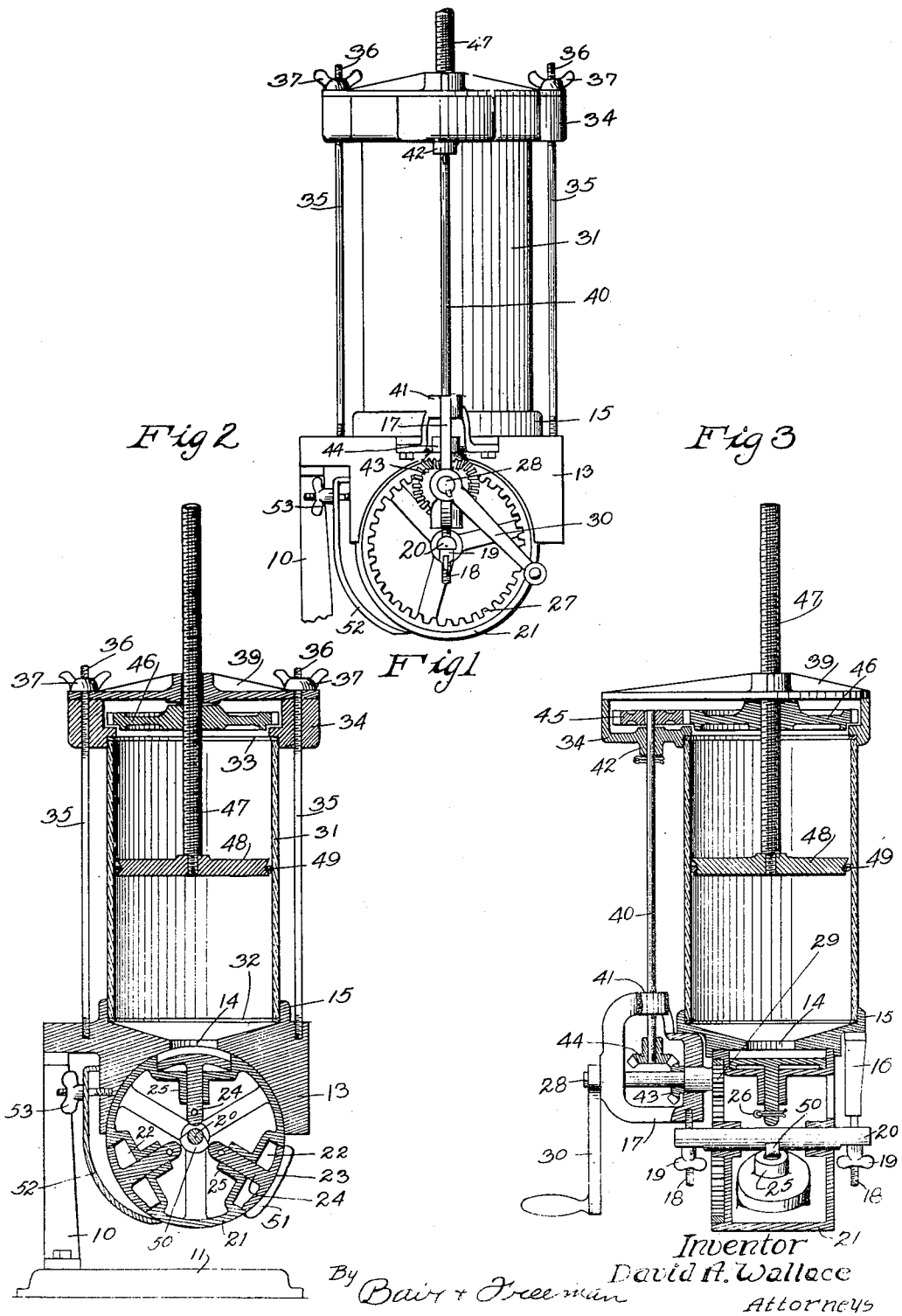
Inventor
David A. Wallace
By Bair & Freeman
Attorneys Patented Nov. 6, 1923.

1,473,590

UNITED STATES PATENT OFFICE.

DAVID A. WALLACE, OF WATERLOO, IOWA, ASSIGNOR OF TWO-THIRDS TO AUGUST SCHOEL, OF WATERLOO, IOWA.

MEAT PRESS.

Application filed March 30, 1922. Serial No. 548,098.

*To all whom it may concern:*

Be it known that I, DAVID A. WALLACE, a citizen of the United States, and a resident of Waterloo, in the county of Blackhawk and State of Iowa, have invented a certain new and useful Meat Press, of which the following is a specification.

The object of my invention is to provide a meat press substantially adapted for forming hamburgers into patties so that they may be fried, the parts being of simple, durable, and comparatively inexpensive construction.

More particularly, my invention relates to a machine adapted to receive a quantity of ground meat and to form the meat into patties without the necessity of the human hand coming in contact with the meat during the forming process.
Still another object is to provide in such a device, means for forcing the meat products into a die and then ejecting them from the die, without at any time coming in contact with the human hands.
With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of my improved meat press.
Figure 2 is a central sectional view through the same; and Figure 3 is a central sectional view.

In the accompanying drawings, I have used the reference numeral 10 to indicate a support which is mounted on the base 11. Fixed to the support 10 is a frame member 13, having an opening 14 thereon.

The upper part of the frame 13 is provided with an annular flange 15. The upper surface, from the flange 15 to the opening 14, is inclined downwardly so as to be funnel shaped.

Fixed to the frame 13 on one side thereof, is a downwardly extending bracket 16. On the opposite side of the frame 13 is a bracket 17. The brackets 16 and 17 are each provided with a screw 18 having the wing nuts 19 thereon.

Supported by the screw 18 is the shaft 20. The wing nuts 19 hold the shaft 20 in position.

Rotatably mounted on the shaft 20 are the die members which I will now describe in detail. A drum 21 is provided which has a number of recesses 22 formed in its surface.

Slidably mounted within the recesses 22 are the plungers 23. Each of the plungers 23 are provided with a stem 24 extending through a bearing member 25. A cotter pin 26 mounted within the stems 24 limits the amount of movement of the plunger 23 in one direction.

The outer surface of the plungers 23 are curved so as to conform to the contour of the drum 21.

On one edge of the drum 21 is formed an internal gear 27. Journalled within the bracket 17 is the shaft 28. The shaft 28 has a gear 29 fixed on one end thereof, which is designed to mesh with the gear 27. The opposite end of the shaft 28 is provided with a crank handle 30.

From the construction of the parts just described, it will be seen that rotation of the crank handle 30 will impart rotation to the gear 29, which in turn will cause the drum 21 to revolve around the shaft 20.

Partially extended within the flange 15, on the frame 13 is a cylinder or container 31. The cylinder 31 is preferably of glass or some other transparent material.

A rubber gasket 32 is received between the frame 13 and the cylinder 31. A gasket 33 is placed upon the upper edge of the cylinder 31. A housing member 34 rests upon the upper end of the cylinder 31.

Rods 35, which have their lower ends anchored in the frame 13 are extended through the housing 34, and have their upper ends screw threaded at 36 so as to receive the wing nuts 37. A cover member 39 rests upon the housing 34 and is provided with openings for receiving the upper ends of the rods 35.

From the construction of the parts just described it will be seen that the cylinder 31, the housing 34, and the cover 39 are all held in position by the rods 35.

A shaft 40 is journalled in the bearing member 41 formed on the bracket 17 and in a bearing member 42, formed in the housing 34.

On the shaft 28, I mount a bevel gear 43 which is in mesh with a bevel gear 44 on the shaft 40. The upper end of the shaft 40 extends into the housing 34 and has a gear 45 fixed thereon.

Received within the housing 34 and below the cover 39 is a gear 46 designed to mesh with the gear 45. The gear 46 is provided with a screw threaded opening which receives the screw threaded rod 47.

The screw threaded rod 47 extends through an opening formed in the cover 39. The lower end of the rod 47 is connected to a flat disk or plunger 48. The periphery of the plunger 48 is beveled so as to form a receiving groove for the rubber band 49.

From the construction of the parts just described, it will be seen that operation of the shaft 28 will impart rotation to the shaft 40 and the gear 45. The gear 45 which is in mesh with the gear 46 will cause the gear 46 to be rotated. The gear 46 being mounted within the housing 34 so that it can only rotate therein, but not move longitudinally, will cause the screw threaded rod 47 to move through the gear 46, causing the plunger 48 to be moved.

The screw threaded connection between the rod 47 and the gear 46, is loose enough to permit the rod to pass through, rather than have it rotate with the gear 46.

On the shaft 20, I fix a cam 50 which is engaged by the stems 24 of each of the plungers 23, during the rotation of the drum 21. The cam 50 is so arranged that when one of the plungers 23 is positioned below the opening 14, it will permit the plunger to pass into the recess 22 and permit a portion of the recess to be filled with the meat products, within the cylinder or container 31.

When the recess has been filled with the meat products and the drum 21 is rotated substantially a third way, the stem 24 engages the cam 50 and causes the plunger to be moved outwardly, moving the meat products 51 outwardly with it.

In order to strip the meat products 51 from the plunger 23 for dropping the same, I provide a stripper 52 which is fixed to the frame 13 by means of the bolt 53.

The lower end of the stripper 52 rests against the periphery of the drums 21 and will cause the meat or other material 51 to be dropped and freed from the rotating drum member.

In the practical operation of my machine, I first fill the cylinder or container with hamburger or some other product. The gear 46, plunger 48, and the cover 39 are all removed when it is desired to fill the container 31.

After the container has been filled the cover and plunger are again placed in position. When the drum 21 is being rotated the plunger 48 is simultaneously being moved for forcing the contents within the cylinder into the die members.

My machine is very practical for preparing hamburger into patties and can be used in park concessions, and may be used in places where it will be displayed while being operated.

The parts are so arranged that everything will be sanitary and the meat products within the container will be always seen.

My machine can be easily assembled and disassembled when it is desired to thoroughly clean the same.

Some changes may be made in the construction and arrangement of the various parts of my invention; without departing from the real spirit and purpose of my invention and it is my intention to cover by my claims, any modified forms of structure of use of mechanical equivalents, which may be reasonably included within their scope.

I claim as my invention:

1. In a meat press of the class described including a frame, a container on said frame, a pair of brackets secured to said frame, a shaft detachably fixed to said brackets, a drum rotatable on said shaft, die members carried by said drum, a plunger mounted in said container and means for simultaneously forcing said plunger and for rotating said drum.

2. In a meat press of the class described including a frame, a container on said frame, a pair of brackets secured to said frame, a shaft detachably fixed to said brackets, a cam on said shaft, a drum rotatable on said shaft, die members carried by said drum, stems on said die members adapted to engage said cam, a plunger mounted in said container and means for simultaneously forcing said plunger and for rotating said drum.

3. In a meat press of the class described including a frame, a container on said frame, a housing on said container, a removable cover on said housing for the container, a pair of brackets secured to said frame, a shaft detachably fixed to said brackets, a drum rotatable on said shaft die members carried by said drum, a plunger mounted in said container, a screw threaded stem on said plunger, a gear on said stem received in said housing and below the cover for limiting its up and down movement and means for simultaneously rotating said gear and said drum.

4. In a meat press of the class described including a base, a frame member having an opening therein on said base, a pair of brackets secured to said frame, a transverse shaft detachably fixed to said brackets, a drum rotatable on said shaft, die members carried by said drum, a cam on said shaft for engagement with said die members, a container on said frame, a plunger in said container, a housing on said container, a gear in said housing and connected to said plunger, gearings on one of said brackets, said gearings being operatively connected to said drum and to said gear for simultaneously rotating said gear and drum as specified.

Des Moines, Iowa, March 16, 1922.

DAVID A. WALLACE.